(12) United States Patent
Spatafora

(10) Patent No.: US 7,168,551 B2
(45) Date of Patent: Jan. 30, 2007

(54) DEVICE LINKING A SUPPLY UNIT AND A USER UNIT FOR THE MANUFACTURE OF TOBACCO PRODUCTS

(75) Inventor: Mario Spatafora, Bologna (IT)

(73) Assignee: G.D S.p.A., Bologna (IT)

( * ) Notice: Subject to any disclaimer, the term of this patent is extended or adjusted under 35 U.S.C. 154(b) by 347 days.

(21) Appl. No.: 10/321,488

(22) Filed: Dec. 18, 2002

(65) Prior Publication Data
US 2003/0116168 A1    Jun. 26, 2003

(30) Foreign Application Priority Data
Dec. 21, 2001   (IT)   .......................... BO2001A0776

(51) Int. Cl.
*B65G 47/26*   (2006.01)
(52) U.S. Cl. .............................. 198/459.5; 198/459.6; 198/453; 131/282
(58) Field of Classification Search ............. 198/459.5, 198/459.6, 452, 453, 530, 534, 468.7, 590; 131/282, 280, 283
See application file for complete search history.

(56) References Cited

U.S. PATENT DOCUMENTS

| | | | |
|---|---|---|---|
| 3,355,004 A | | 11/1967 | Rupert |
| 3,565,237 A | | 2/1971 | Strydom |
| 4,042,094 A | * | 8/1977 | Schmermund ........... 198/347.1 |
| 4,078,648 A | | 3/1978 | Hinchcliffe et al. |
| 4,336,873 A | | 6/1982 | Focke |
| 4,413,640 A | * | 11/1983 | Wahle et al. ............... 131/281 |
| 4,507,040 A | * | 3/1985 | Baese et al. ................ 414/403 |
| 4,744,453 A | * | 5/1988 | Krause et al. ........... 198/347.2 |
| 4,790,333 A | * | 12/1988 | Focke et al. ................ 131/283 |
| 5,018,539 A | * | 5/1991 | Gamberini et al. ......... 131/280 |
| 5,353,815 A | * | 10/1994 | Gamberini et al. ......... 131/283 |
| 5,464,027 A | * | 11/1995 | Bina et al. .................. 131/283 |
| 5,730,277 A | * | 3/1998 | Meinke et al. .......... 198/468.6 |
| 5,736,682 A | * | 4/1998 | Heitmann et al. ............ 177/16 |

FOREIGN PATENT DOCUMENTS

| | | |
|---|---|---|
| GB | 2143788 | 2/1985 |
| WO | 02096227 | 12/2002 |

* cited by examiner

*Primary Examiner*—Gene O. Crawford
*Assistant Examiner*—Rashmi Sharma
(74) *Attorney, Agent, or Firm*—Timothy J. Klima

(57) ABSTRACT

A supply unit and a user unit employed in the manufacture of tobacco products, typically cigarettes and the like, are linked by a duct along which a mass of the cigarettes is advanced from the outfeed of the supply unit toward the infeed of the user unit. The advancing mass of cigarettes is parted at an intermediate zone of the duct either by rods or by a pair of frames, in such a way as to create a void that will accommodate a trolley directed into the duct from a housing by an elevator; once inside the duct, the trolley proceeds to push the mass of cigarettes from the intermediate zone toward the inlet of a hopper in such a way as to empty the duct completely, for example when changing over from one brand of cigarette to another. To advantage, the trolley is composed of two articulated structures so that its geometry and dimensions can be varied to match the variations in geometry and depth of the duct.

34 Claims, 9 Drawing Sheets

US 7,168,551 B2

DEVICE LINKING A SUPPLY UNIT AND A USER UNIT FOR THE MANUFACTURE OF TOBACCO PRODUCTS

BACKGROUND OF THE INVENTION

The present invention relates to a device linking a supply unit and a user unit for the manufacture of tobacco products.

It is the practice among manufacturers of tobacco products to connect a supply unit, consisting by way of example in a cigarette maker or filter tip attachment, to a user unit such as a packer. The connection is provided normally by means of a duct extending along a path that presents straight horizontal and vertical portions joined together by curved portions, along which a flow of cigarettes is caused to advance continuously as a compact mass with the single cigarettes disposed transversely to the conveying direction. It is a necessary condition for the smooth operation of such a link that the mass of cigarettes be maintained as compact as possible, in order to prevent the single cigarettes from becoming positioned incorrectly as they advance.

Conversely, it will often happen during operation of the machine units in question that the flow is interrupted for various reasons, such as a break in the flow from the supply unit caused by a failure or by a pause to enable changeover from one brand of cigarette to another.

In these situations, the interrupted flow causes a loss of compactness in the mass of cigarettes, with the result that the distribution of the cigarettes is rendered disorderly and requires the attention of an operator. Besides seeking to restore the compactness of the mass, the operator will also have to remove all of the cigarettes from the duct.

The object of the present invention is to provide a device for linking a supply unit and a user unit handling tobacco products, such as will be unaffected by the above noted drawback.

SUMMARY OF THE INVENTION

The stated object is realized according to the present invention in a device linking a supply unit and a user unit for the manufacture of tobacco products, comprising at least one feed duct along which to direct a mass of products from the outfeed of a supply unit to the infeed of a user unit, wherein the duct presents two guide walls determining the depth of the mass of products.

To advantage, the device comprises means by which to separate the mass of products at a predetermined zone of the duct, and mobile means capable of traveling along the duct from the predetermined zone through a predetermined distance.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
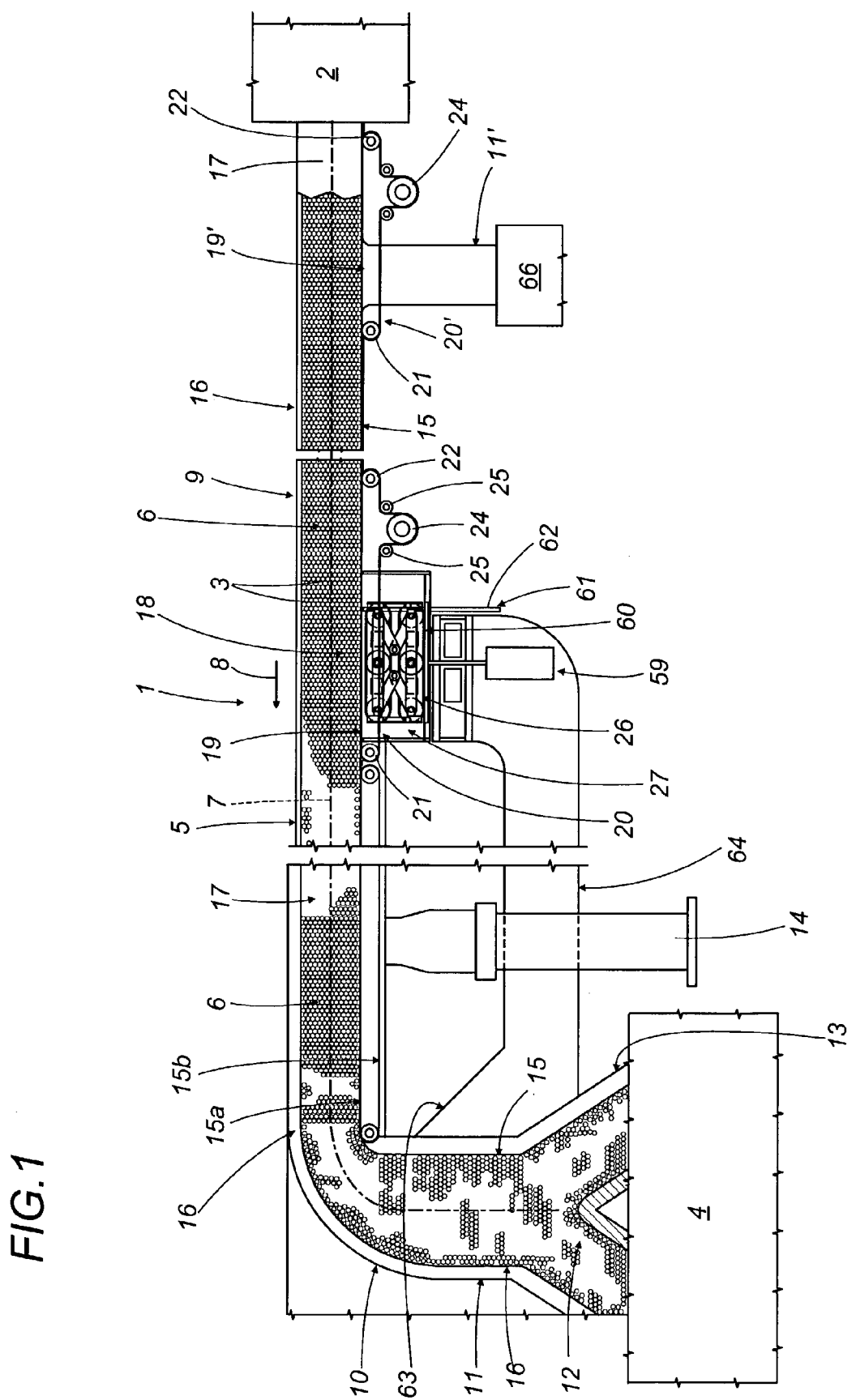
FIG. 1 illustrates a device linking a supply unit and a user unit for the manufacture of tobacco products according to the present invention, viewed schematically in a side elevation with certain parts omitted.

Referring to FIG. 1 of the drawings, 1 denotes a device, in its entirety, serving to link a supply unit 2 consisting by way of example in a machine turning out cigarettes 3, and a user unit 4 consisting likewise by way of example in a packaging machine.

The device 1 comprises a feed duct 5 inside which a mass 6 of cigarettes 3 is made to advance along a predetermined path 7 in a predetermined direction 8 normal to the longitudinal axes of the cigarettes 3. In the example illustrated, the duct 5 comprises a substantially horizontal first straight leg 9 departing from the supply unit 2 and connected by way of a curved leg 10 to a substantially vertical second straight leg 11 terminating at the inlet 12 of an infeed hopper 13 serving the user unit 4.

The feed duct 5 is supported by a frame (not illustrated) comprising an upright member 14, delimited horizontally by a bottom wall 15 and a top wall 16 establishing the depth of the enclosure, and compassed laterally by two vertical walls 17. The bottom wall 15 coincides with the horizontal top branch 15a of a belt conveyor 15b, of which FIG. 1 illustrates only a part, occupying a section of the duct 5 that extends from an intermediate zone 18 to the curved leg 10.

As illustrated in FIGS. 1, 4, 5, 6, 7 and 8, the straight horizontal leg 9 of the feed duct 5 presents an opening 19 in the bottom wall 15, coinciding with the intermediate zone 18 mentioned above.

The opening 19 is occupied by a pair of belt conveyors 20 spaced apart transversely to the feed direction 8 and aligned substantially with the conveyor 15b first mentioned.

As illustrated to advantage in FIGS. 4, 5, 6 and 7, each of the two conveyors 20 is looped around two end pulleys 21 and 22 to create a top branch 23 occupying the same plane as the bottom wall 15 and/or the top branch 15a of the first conveyor 15b, and around a bottom pulley 24 interposed between two diverting rollers 25.

One end pulley 22 of each belt is associated with respective drive means not illustrated in the drawings, whilst the other end pulley 21, located downstream relative to the feed direction 8 followed by the mass 6 of cigarettes 3, is capable of movement back and forth parallel to the feed direction 8, guided by a respective slide 21a (see FIG. 8) coupled with a relative lateral track 21b. The two tracks 21b are positioned on opposite sides of the duct 5, as indicated in FIG. 8.

The movement of each end pulley 21 is brought about as a result of the relative bottom pulley 24 of the conveyor 20 being traversed in the corresponding vertical direction through the agency of conventional actuator means not illustrated in the drawings. Accordingly, each belt conveyor 20 presents one retractable end coinciding with the movable end pulley 21.

Figure 5:
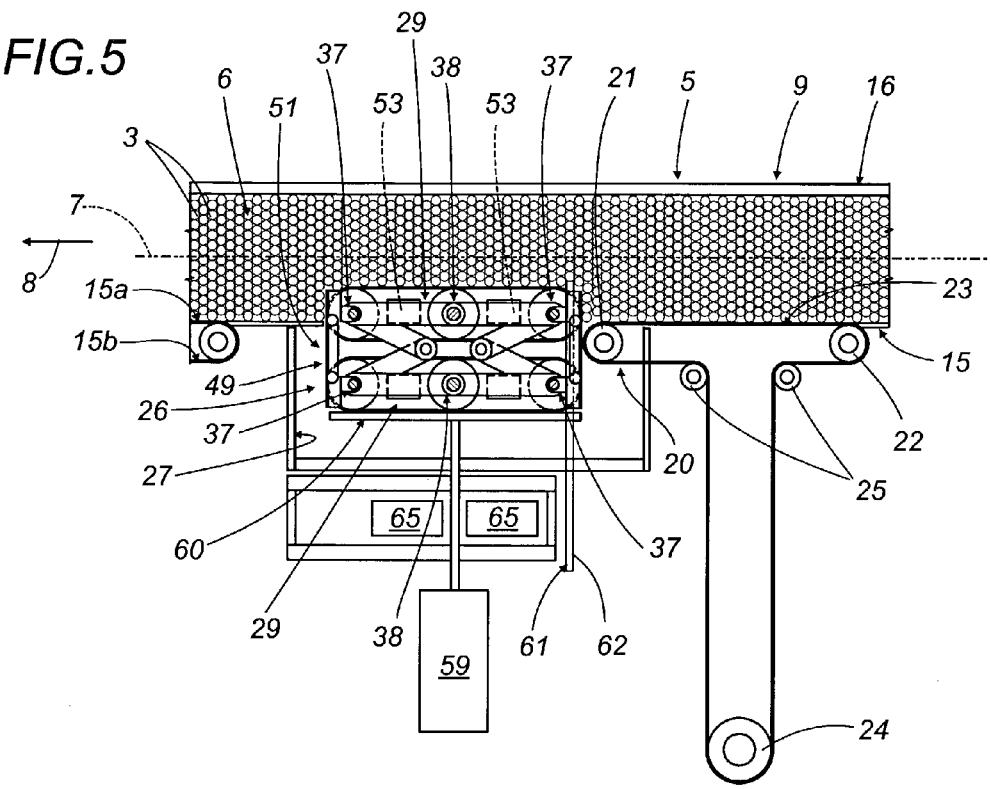
Figure 6:
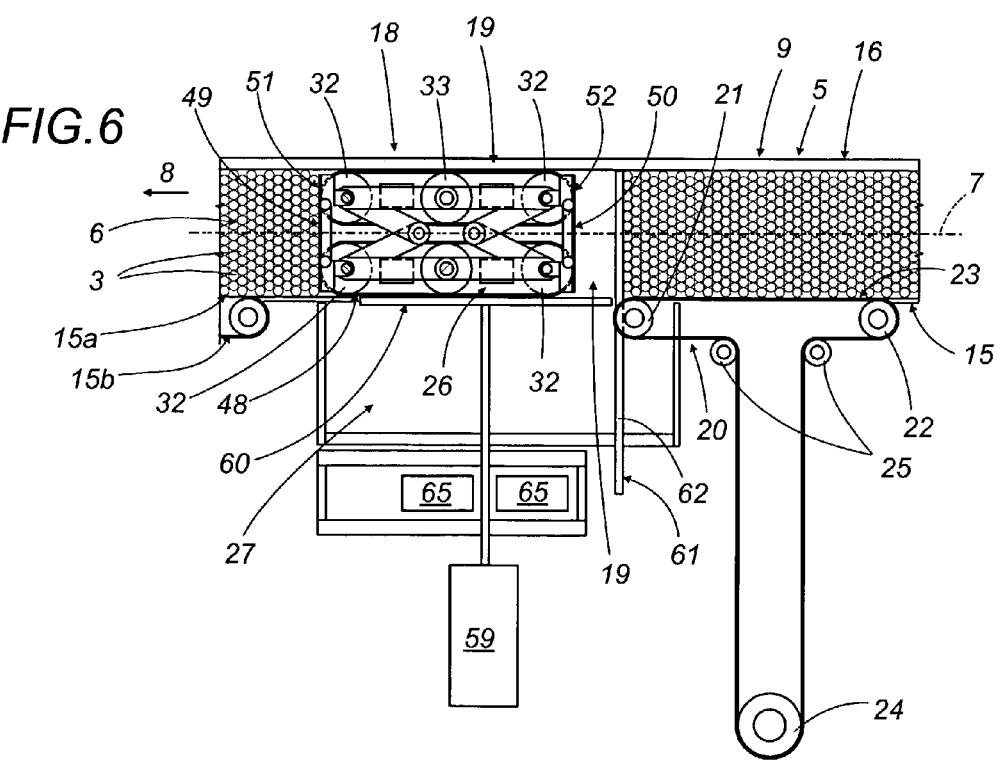

The belt conveyors 20 combine to create a passage at the intermediate zone 18, afforded to mobile means denoted 26 in their entirety, which, from an at-rest position internally of a relative housing 27, outside the dimensional compass of the duct 5, are able to enter the duct 5 and thereupon to travel along the feed path 7 from the intermediate zone 18 through a given distance. In the event that the transverse dimension of the mobile means 26 is greater than the distance separating the two conveyors 20, a passage of width sufficient to admit the selfsame means 26 can be created by retracting the movable pulleys 21 parallel with the feed direction 8, as indicated in FIGS. 5 and 6.

Figure 7:
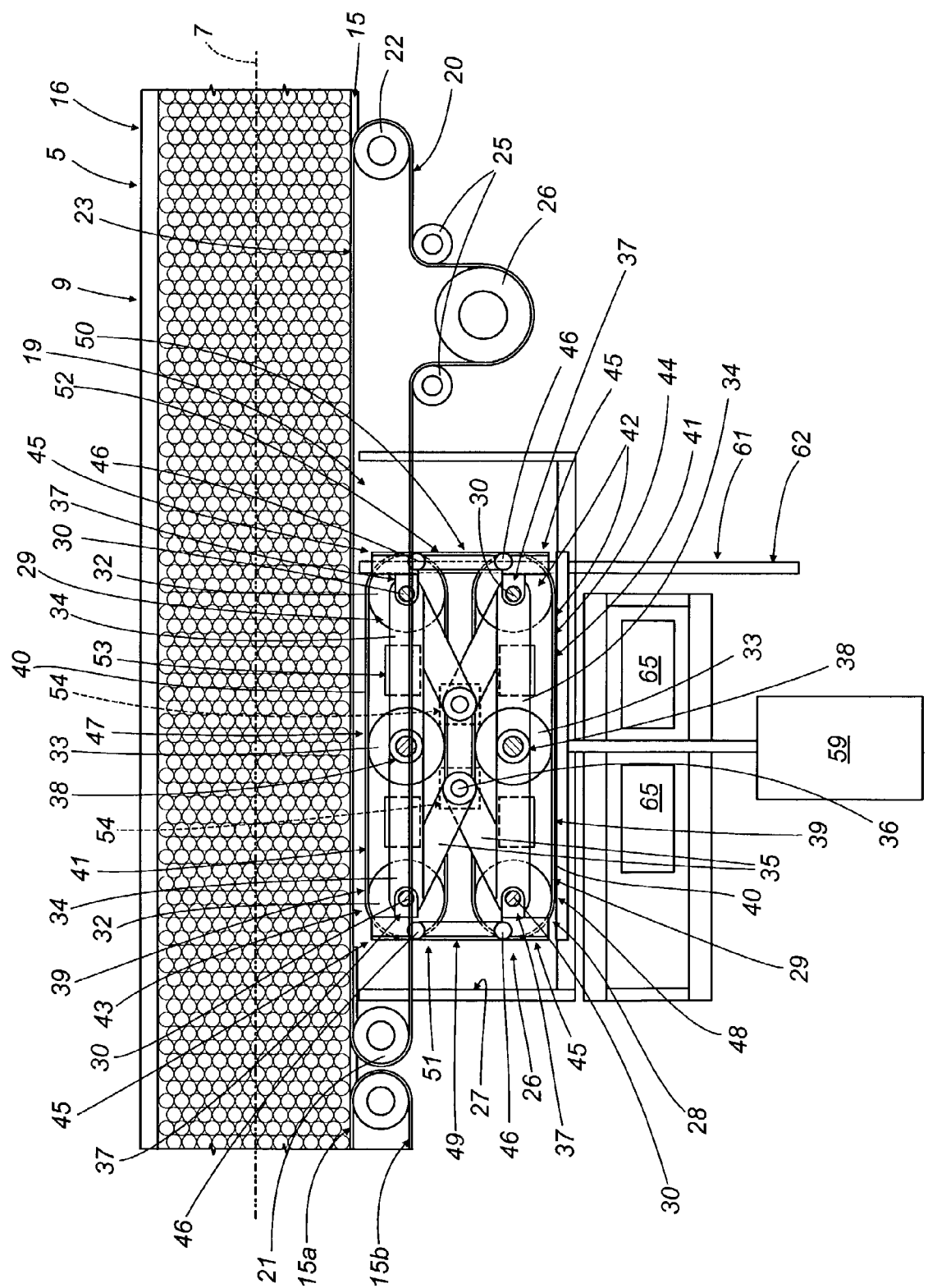
FIG. 7 is an enlargement of FIG. 4.
Figure 8:
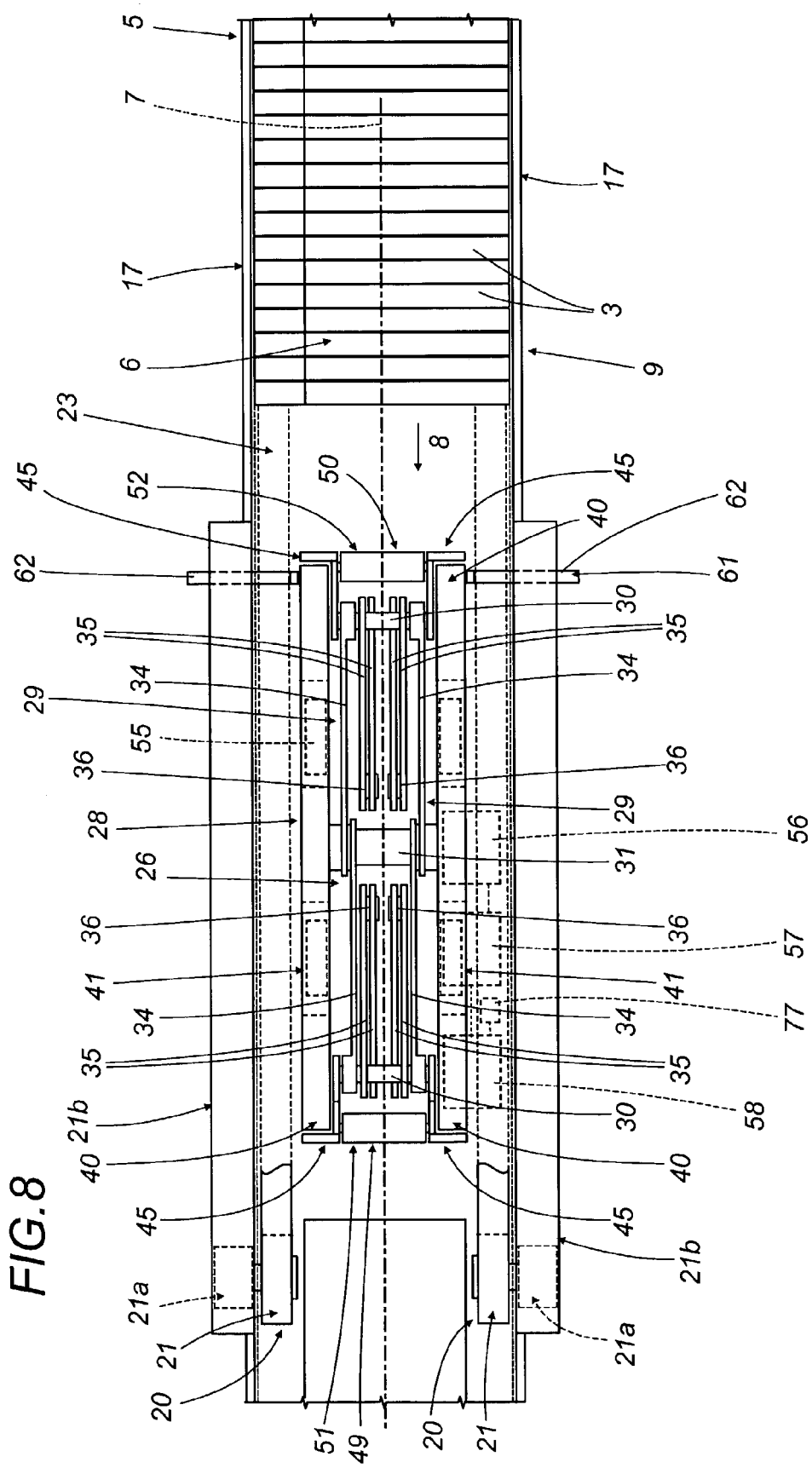
FIG. 8 shows the detail of FIG. 7 in a plan view.
Figure 9:
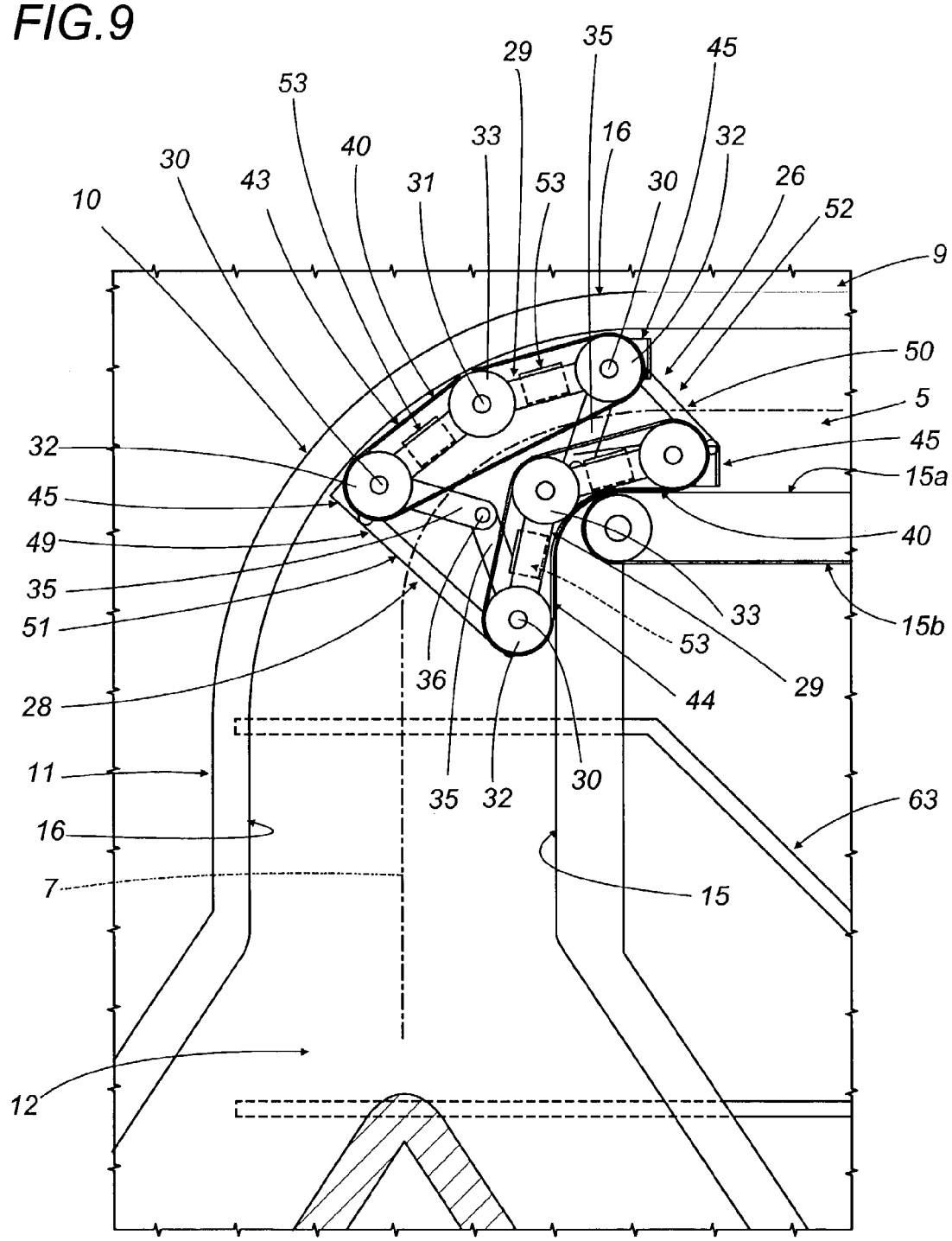
FIG. 9 is an enlarged side elevation showing the detail of FIG. 7 located in a curved portion of the link and in a different operating configuration.

Referring in particular to FIGS. 7, 8 and 9, the mobile means 26 comprise a trolley 28 incorporating first and second articulated structures 29 positioned side by side and connected together by first and second shafts 30 and 31 extending transversely to the feed path 7 and parallel to the axes of the cigarettes 3.

The first shafts 30 are four in number and placed at the four corners of the articulated structures 29, whilst the second shafts 31 are two in number and occupy intermediate positions between each pair of first shafts 30. The trolley also comprises a set of wheels 32 mounted rotatably to the opposite ends of each of the two top first shafts 30 and the two bottom first shafts 30, and a set of wheels 33 mounted to the opposite ends of each second shaft 31.

Also associated pivotably with the ends of each top first shaft 30 are first ends of two first rods 34, of which the remaining ends are associated pivotably with the ends of the top second shaft 31.

Similarly, the opposite ends of two first rods 34 are associated pivotably with the ends of each bottom first shaft 30 and with the ends of the bottom second shaft 31, respectively.

In particular, the two top first rods 34 are disposed in mutual alignment along the direction 8 of the feed path 7 and substantially parallel to the two bottom first rods 34, likewise aligned mutually along the direction 8 of the feed path 7. Each of the wheels denoted 33 occupies an intermediate position between the two respective top and the two respective bottom corner wheels 32.

The opposite ends of each first shaft 30 also provide pivots for respective first ends of second rods 35, of which the second ends are united by way of respective common hinges 36. More exactly, each of the first and second articulated structures 29 is identifiable as having first hinges 37 coaxial with the first shafts 30, second hinges 38 coaxial with the second shafts 31 and third hinges coinciding with the aforementioned common hinges 36.

Observing FIG. 7, it will be seen that the second rods 35 of each articulated structure 29 are arranged in pairs and disposed in a Vee formation of which the vertex coincides with the third hinge 36. The two top and the two bottom corner wheels 32 of each articulated structure 29 function as end pulleys for respective conveyor means 39 consisting in relative belt loops 40 each wrapped around two end wheels 32 and located in contact with the relative intermediate wheel 33. The conveyor means 39 provide transport means 41 by which the trolley 28 is rendered capable of movement along the feed duct 5. In the event that the trolley 28 is equipped with its own drive means, as will be explained in due course, the transport means 41 will consist in traction means 42 providing each articulated structure 29 with top and bottom live surfaces denoted 43 and 44 respectively.

The live surfaces 43 and 44 of each articulated structure 29 are afforded respectively by the top branch of the top belt loop 40 and the bottom branch of the bottom belt loop 40. Viewing the trolley 28 in its entirety (FIGS. 7 and 8), the two top branches of the top belt loops 40 thus combine to establish a top face 47 of the trolley 28; similarly, the two bottom branches of the bottom belt loops 40 combine to establish a bottom face 48 of the trolley 28.

The articulated structure 29 further comprises angle brackets 45 attached by first ends to the first hinges 37 at opposite ends of each of the four first shafts 30. Each bracket 45 presents a pin 46 located at an intermediate point on its length and disposed parallel to the axes of the shafts 30. Thus, the front aspect of the trolley 28, considered in its entirety, presents two pairs of brackets 45 arranged with the relative pins 46 coaxially disposed, and with one end of an elastic band 49 looped around each pair of pins 46. Similarly, the rear aspect of the trolley 28 presents two further pairs of brackets 45 arranged with the relative pins 46 coaxially disposed and with one end of an elastic band 50 looped around each pair of pins 46.

The free ends of the brackets 45 combine with the external branches of the bands 49 and 50 to establish a front face 51 and a rear face 52 of the trolley 28.

It will be seen from the foregoing that the nature of the two articulated structures 29 making up the trolley 28 is such as to allow variations in width and geometry of the selfsame trolley by rotating the first and second rods 34 and 35 about the hinges 36, 37 and 38, in such a manner as to maintain the transport means 41 firmly in contact with the guide walls 15 and 16 as the trolley 28 advances along the feed duct 5.

To this end, the trolley 28 is equipped with active components denoted 53, indicated schematically in the drawings, such as will allow of varying the distance between the transport means 41, or between the live surfaces 43 and 44 if the trolley has its own drive means. The active components in question might take the form of coil springs 54 coupled to the third hinges 36 in such a way that the variation of the angle compassed by the second rods 35 is controlled elastically. Alternatively, such components could be magnets 55 placed along each of the first rods 34 and designed to interact with the guide walls 15 and 16 of the feed duct 5. In this instance the walls 15 and 16 might be embodied in ferromagnetic or magnetic material, or incorporate cores of such material, so as to interact with the magnets 55 of the trolley 28.

The trolley 28 also carries drive means 56, indicated schematically in FIG. 8, capable of actuating at least one of the aforementioned live surfaces 43 or 44 by way of the respective shafts 30 or 31. The drive means 56 can be coupled to the shafts in such a way that rotation is transmitted to at least one of the respective wheels 32 or 33.

The drive means 56 in question are powered by a rechargeable battery indicated schematically as a block 57, which is interlocked to a control unit 58. The unit 58 will be equipped with receiving means 77 able to pick up electromagnetic waves used to control the movements of the trolley 28.

The sizing of the drive means 56, the battery 57 and the control unit 58 may be such as to occasion appreciable changes in the proportions of the central part of the trolley 28, though without modifying the transverse distance between the belt loops 40.

Figure 4:
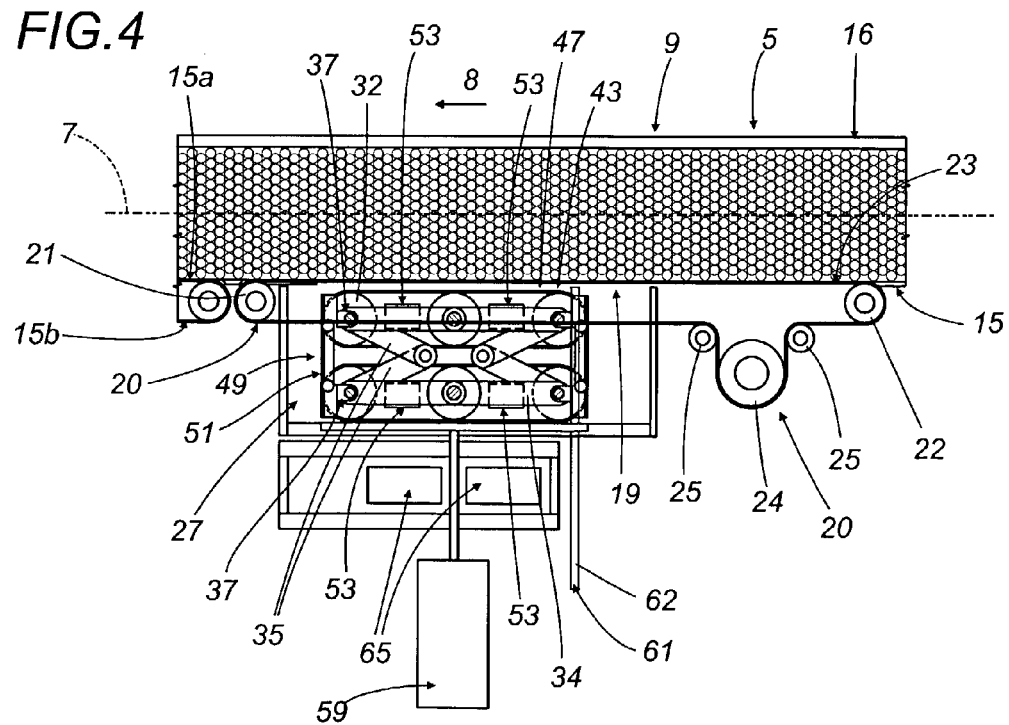
FIGS. 4, 5 and 6 are schematic side elevations illustrating the device of FIG. 1 in three successive operating steps.

As illustrated particularly in FIGS. 4, 5, 6 and 7, the device comprises lifting means 59 aligned with the predetermined intermediate zone 18 of the duct 5, comprising, for example, a table 60 on which the trolley 28 is supported when occupying the housing 27 and lying outside the duct 5. The table 60 is capable of movement, induced by the lifting means 59, between a lowered at-rest position inside the housing 27 as illustrated in FIGS. 4 and 7, and a raised position of nominal alignment with the bottom guide wall 15 and/or the top branch 15*a* of the belt conveyor 15*b* first mentioned, allowing the trolley 28 to assume an operating position internally of the feed duct 5 as illustrated in FIG. 6.

In order to create a space within the mass 6 of cigarettes 3 at the intermediate zone 18 and thus allow the trolley 28 to be introduced into the feed duct 5, the device comprises means denoted 61 in their entirety, by which to separate the mass 6 of cigarettes. Such means 61 comprise a pair of vertical rods 62 extending substantially perpendicular to the feed path 7 and capable of movement along respective trajectories inside the duct 5, near to the vertical walls 17. The vertical rods 62 are movable between a position outside the compass of the duct 5, indicated in FIGS. 4 and 7, and an operating position internally of the duct 5 and immediately upstream of the trolley 28 in the feed direction 8 followed by the mass 6.

The movement of the rods 62 is timed to coincide with that of the table 60 between the at-rest and operating positions. In this instance, as discernible from FIG. 5, the top branches of the belt loops 40 that provide the transport means 41 form part of the separating means 61 and operate in conjunction with the rods 62, functioning as means by which to remove the cigarettes 3 from the part of the duct 5 about to be occupied gradually by the trolley 28, whereas once inside the duct 5, the rods 62 function as retaining elements serving to block the mass 6 of cigarettes 3 upstream of the intermediate zone 18.

In operation, supposing that the duct 5 is to be emptied completely, for example following a lengthy pause due to inactivity of the supplier unit and/or to a change of brand, the movement of the mass 6 of cigarettes 3 is brought to a halt in the part of the duct 5 upstream of the trolley 28, the top branch 15*a* of the downstream belt conveyor 15*b* is set in motion, and the separating means 61 are activated. More exactly, the trolley 28 is elevated by the lifting means 59 from the housing 27 up into the duct 5, causing the two belt loops 40 of the top live surfaces 43 to pass between the two conveyors 20 and into contact with the mass 6 of cigarettes 2. At this juncture, in the event that the dimensions of the trolley 28 beneath the respective live surfaces 43 are greater than the distance between the two conveyors 20, as mentioned previously, the end pulleys 21 will retract to enable the passage of the trolley 28 through the opening 19.

During the elevation of the trolley 28, the two live surfaces 43 afforded by the top branches of the belt loops 40 will translate in the feed direction 8 and thus favor the displacement of the cigarettes 3 in the part of the mass 6 occupying the intermediate zone 18; the moving elements in question thus provide means 40 and 43 by which to remove the mass 6 of cigarettes 3 from the intermediate zone 18 and are one and the same as the conveyor means 39, which thus perform the function of outfeed conveyors in respect of the mass 6 of cigarettes occupying the zone 18.

The paired rods 62 of the separating means 61 operate in conjunction with the trolley 28, moving perpendicularly into the duct 5 so as to establish a retaining wall by which the mass 6 of cigarettes 3 located upstream of the intermediate zone 18 is held back as indicated in FIG. 6.

Once the trolley 28 reaches its upper travel limit, the movement of the top live surfaces 43 is reversed and the bottom live surfaces 44 are activated, with the result that these same surfaces will engage the top wall 16 of the duct 5 and the surface of the table 60, respectively, and cause the trolley 28 to advance along the duct 5 in the feed direction 8. The trolley 28 is now carried toward the inlet 12 of the infeed hopper 13 on the top branch 15*a* of the downstream conveyor 15*b*, its front face 51 pushing the mass 6 of cigarettes forward so that the stretch of the duct 5 between the intermediate zone 18 and the inlet 12 of the infeed hopper 13 is emptied completely. During this step, the front face 51 provides means by which to push the mass 6 of cigarettes. More exactly, such pushing means 51 consist in the elastic band 49 and the free ends of the corresponding pairs of angle brackets 45, which also provide contact means of variable length offered directly to the mass 6 of cigarettes.

Figure 2:
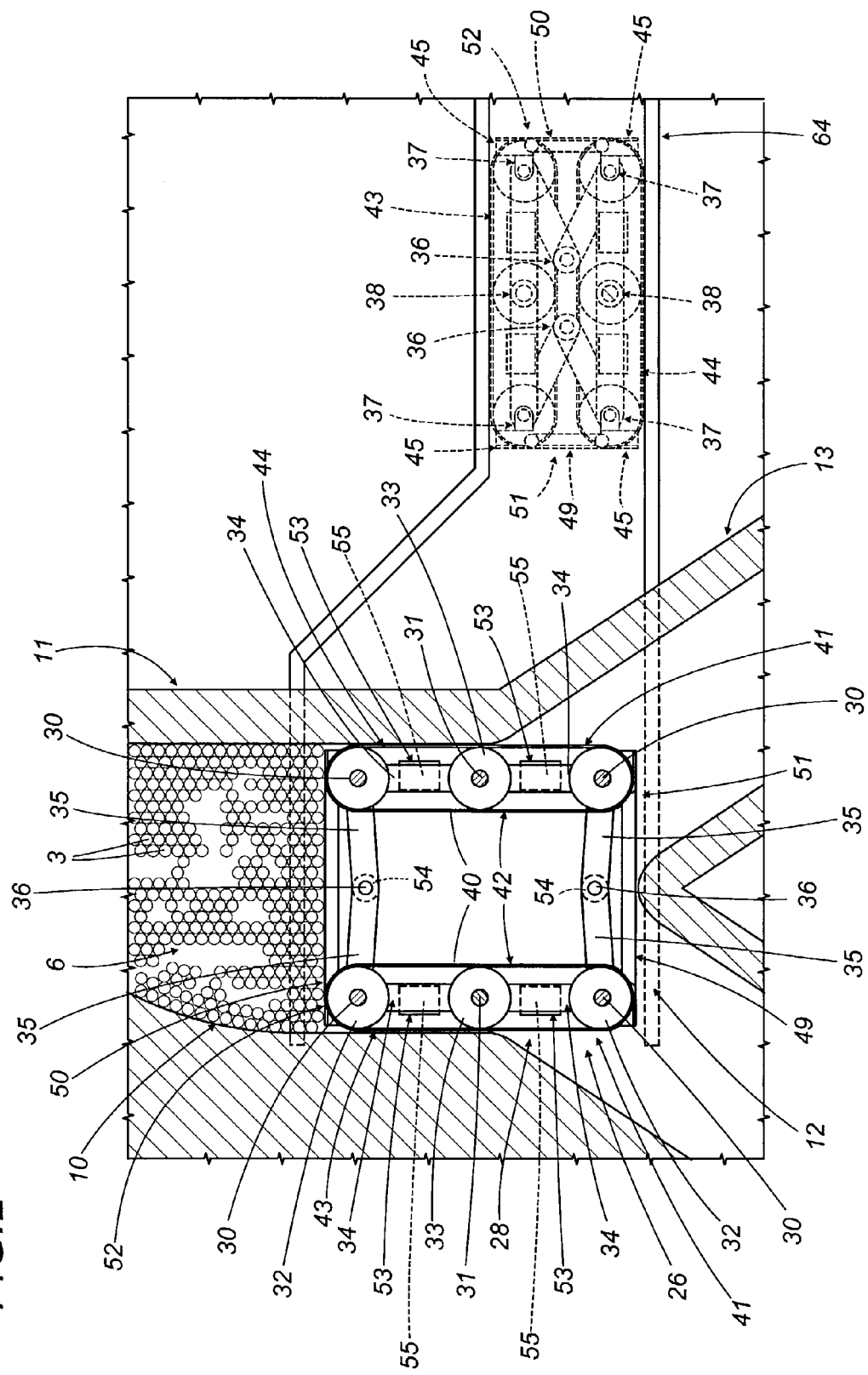
FIG. 2 shows an enlarged detail of the device in FIG. 1, viewed schematically in a side elevation with certain parts omitted for clarity, and in different operating configurations.
Figure 3:
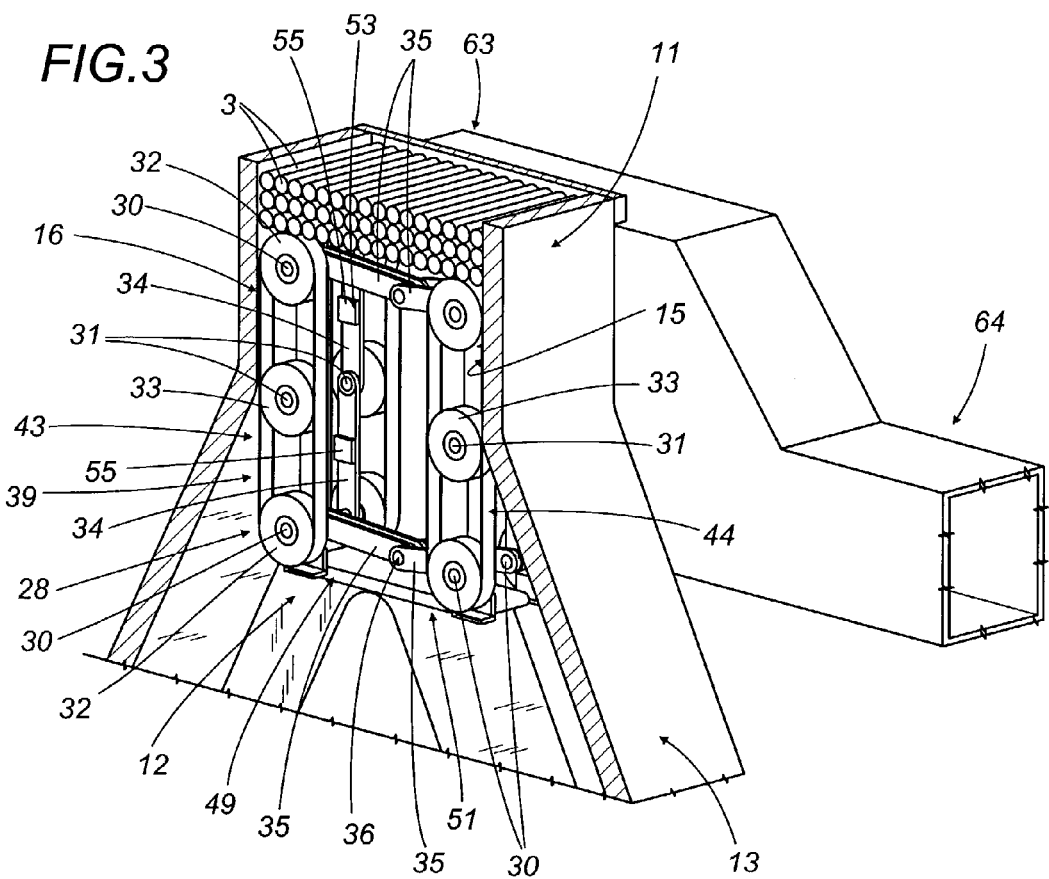
FIG. 3 shows the detail of FIG. 2 schematically and in perspective with certain parts omitted for clarity.

As illustrated in FIGS. 2 and 3, the trolley 28 arrives at the inlet 12 of the hopper 13 disposed with the four live surfaces 43 and 44 in contact with the side walls 15 and 16 of the vertical leg 11 of the duct 5, and the front face 51 lying horizontally near the mouth of the hopper 13.

At this point, as illustrated schematically in FIG. 3, the trolley 28 is transferred from its position occupying the mouth of the hopper 13, through the agency of conventional translation means (not indicated), to the inlet 63 of a return duct 64 extending beneath and parallel with the feed duct 5 back to the housing 27. Once inside the inlet 63, the trolley 28 is turned through 90° by the action of flipper means, likewise conventional and not illustrated, and directed into the return duct 64. The trolley 28 thereupon returns to the housing 27 under the power of its own drive means 56 and repositions in readiness for a further cycle. The housing 27 is equipped with means 65 for recharging or replacing the battery 57.

Importantly, as indicated in FIG. 9, when the trolley 28 passes along the curved leg 10 of the feed duct 5, the articulated structures 29 and the active components 53 combine to maintain the belt loops 40 of the live surfaces 43 and 44 in contact with the walls 15 and 16 of the duct 5. Accordingly, the front and rear elastic bands 49 and 50 will vary in length as the cross section of the duct 5 becomes wider. Like the front band 49, the rear band 50 and the corresponding pairs of angle brackets 45 function as contact means of variable length offered directly to the mass 6 of cigarettes.

Likewise of importance is the fact that, instead of regaining the housing 27 by way of the return duct 64 described above, the trolley 28 can also reverse back along the duct 5 under the power of its own drive means 56 and the live surfaces 43 and 44 and/or carried by the top branch 15*a* of the conveyor 15*b*, running in the opposite direction, ultimately assuming a position of proximity to the supply unit 2 and engaging in contact with the remaining mass 6 of cigarettes 3 retained upstream of the two vertical rods 62 so that these same cigarettes can be diverted into a recipient, for example, a storage bin 66. As the trolley 28 reaches the position occupied by the vertical rods 62, the rods will retract. In practice, the bin 66 will be connected to the duct 5 by way of a vertical leg 11' of which the inlet end is connected to the duct 5 by way of an opening 19' occupied by a pair of retractable conveyors 20' identical to the conveyors 20 already described.

Another function is performed by the trolley 28 on assuming the aforementioned position of proximity to the supply unit 2. With the trolley 28 in this same position, or at least in a position substantially coinciding with the intermediate zone 18, the mass 6 of new cigarettes can be engaged by the rear face 52 and their passage toward the inlet 12 of the infeed hopper 13 thus accompanied and controlled by the trolley 28, which thereafter will be shifted sideways and flipped through 90° as already described. Accordingly, the rear face 52 provides means by which to cushion the mass 6 of cigarettes 3 and accompany it along the duct 5.

In the case described previously, the rear elastic band 50 and the free ends of the two pairs of angle brackets 45 provide means by which to cushion and accompany the mass 6 of cigarettes 3 to the end of restoring normal operating conditions.

Figure 10:
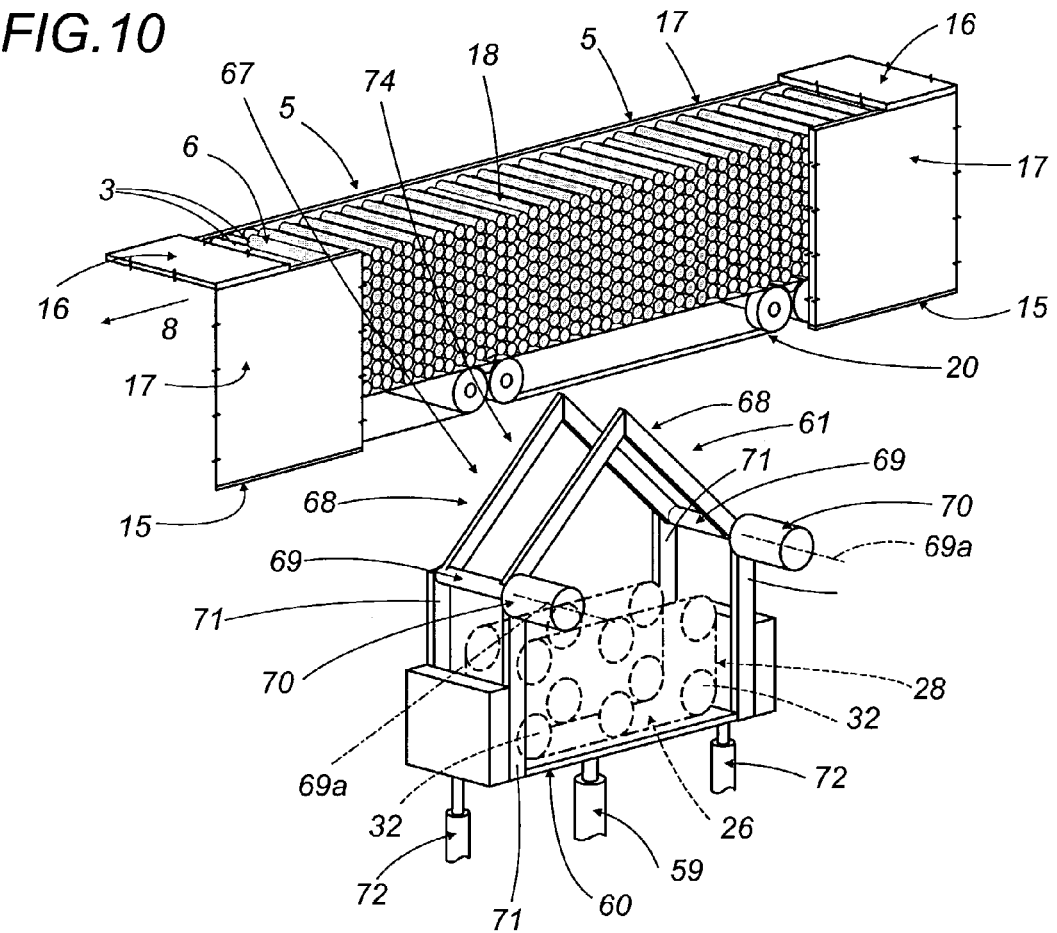
FIGS. 10 and 11 are perspective views showing an enlarged detail of the device in FIG. 1, illustrated in a second embodiment and seen in two successive operating steps.

In the example of FIG. 10, the step of directing the trolley 28 into the duct 5 at the intermediate zone 18 is preceded by a step of creating a void in the mass 6 of cigarettes through the agency of separating means 61 which in this instance appear as spreader means, denoted 67 in their entirety. More particularly, such means 67 comprise two frames 68, each mounted to a relative shaft 69 positioned transversely to the feed direction 8 and rotatable about a corresponding axis 69a through the agency of actuator means 70. The shafts 69 in their turn are mounted to a rigid structure rising from the table 60 and consisting in two pairs of vertical rods 71. The rigid structure is set in motion vertically by two respective actuators 72 and comprises guides 73, coupled with the rods 71, on which the table 60 is slidable during the vertical movement produced by the aforementioned lifting means 59.

In operation, during the elevating movement brought about by the actuator means 72, the frames 68 can be positioned at first substantially parallel to the duct 5, then, on reaching a position substantially in the same plane as the bottom wall 15 of the duct 5, spread to assume the separating position.

When fully spread, the two frames 68 will be positioned mutually parallel and set transversely to the channel 5, compassing a void of length sufficient to accommodate the trolley 28.

In a further arrangement, the two frames 68 might be angled relative to the feed direction followed by the mass 6 of cigarettes 3, with the free ends in mutual contact and creating a wedge element 74.

The wedge element 74 is capable of movement between a position outside the dimensional compass of the feed duct 5, and a position of penetration within the mass 6 of cigarettes. On reaching the latter position, the two frames 68 will be rotated away from one another by the respective actuators 70 and positioned mutually parallel, transversely to the channel 5, separating the mass 6 of cigarettes and creating a space able to accommodate the trolley 28 when raised into the duct 5 by the lifting means 59.

Figure 11:
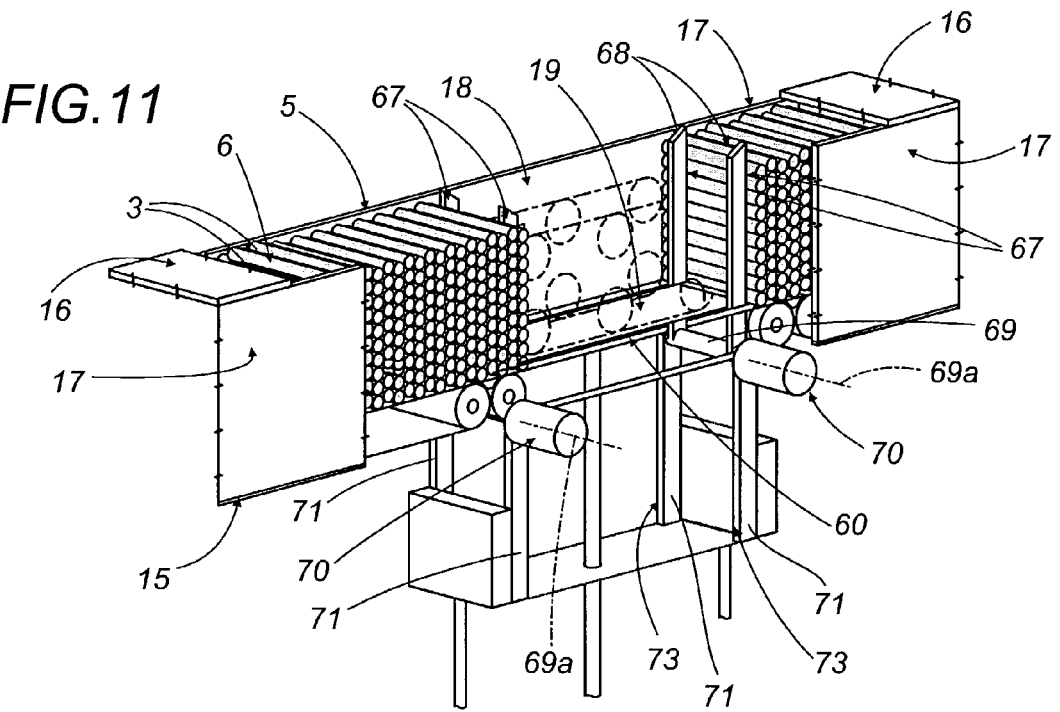
Figure 12:
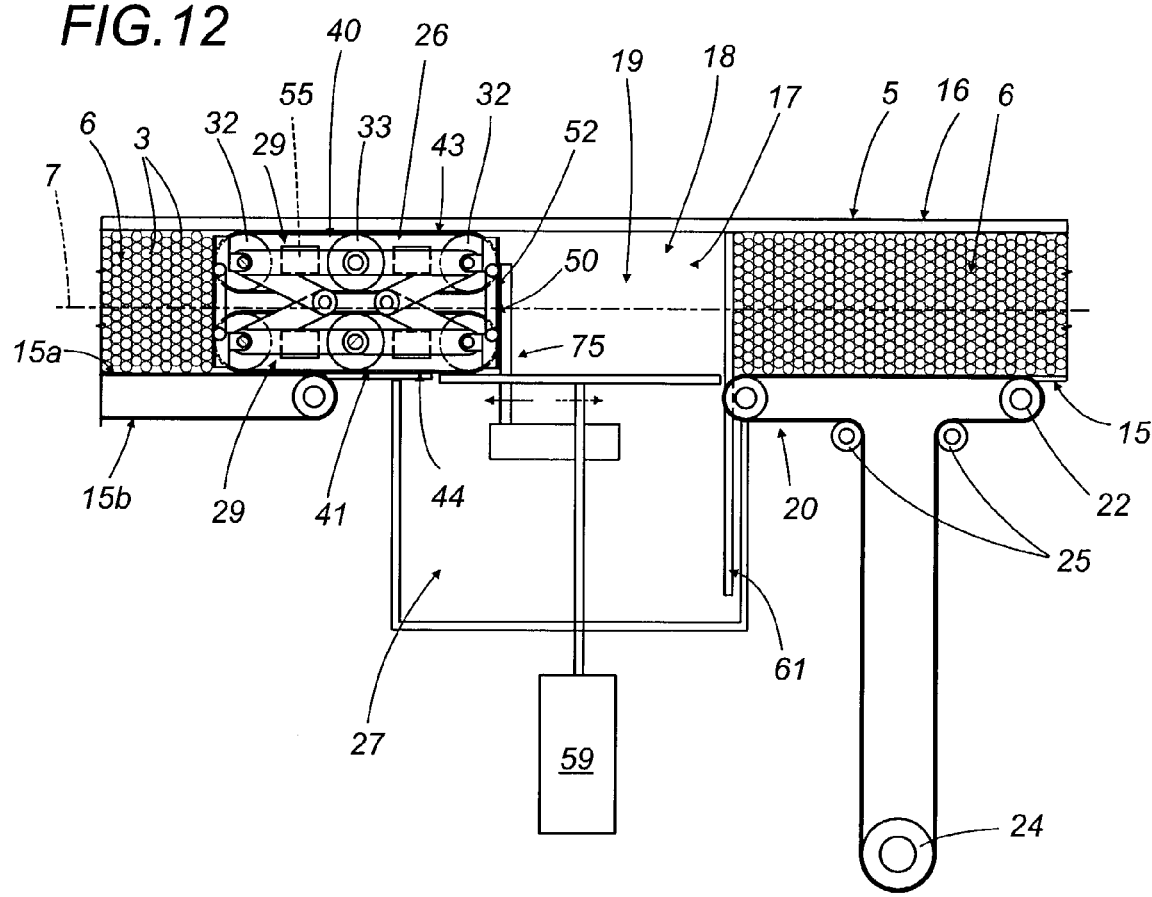
FIG. 12 shows the device of FIG. 6 in an alternative embodiment.
Figure 13:
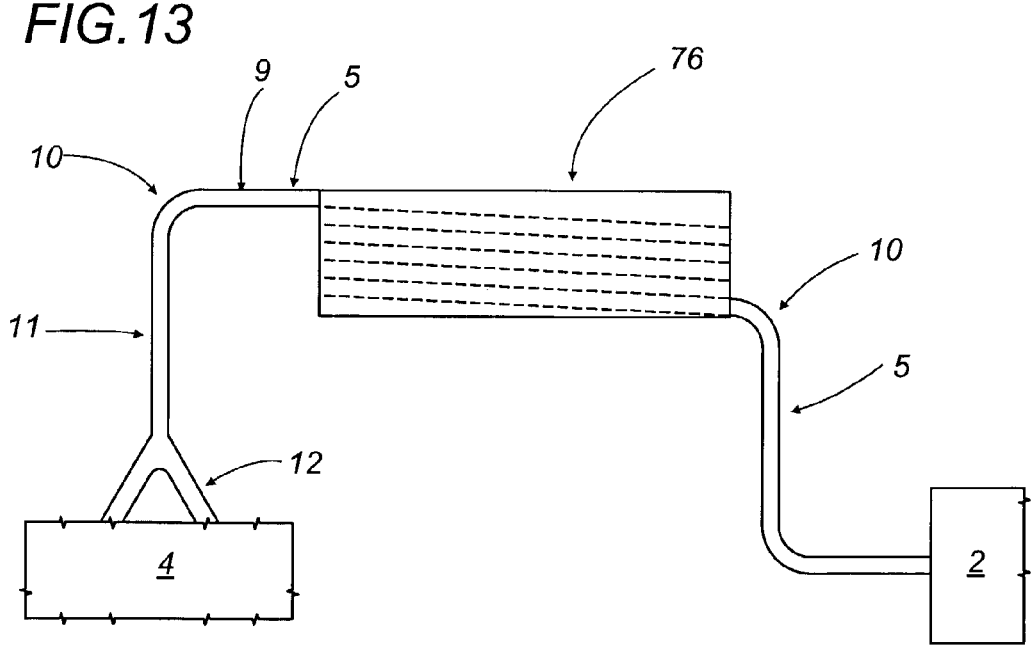
FIG. 13 is a schematic showing the device of FIG. 1 in an alternative embodiment.

In both of the cases described, as illustrated in FIG. 11, the inserted trolley 28 is able to travel along the duct 5 either under the power of its own drive means 56 or through the agency of a pusher 75 insertable, needless to say, between the two uprights of the frame 68 on the downstream side.

The trolley 28 proves especially advantageous in a situation where the duct 5 covers a particularly long path and incorporates a first-in-first-out (FIFO) type of temporary storage facility 76 through which the mass 6 of cigarettes 3 is directed.

Whilst the examples described and illustrated all relate to a single trolley 28 able to perform the steps of pushing or accompanying the mass 6 of cigarettes 3 along the duct 5 between the intermediate zone 18 and the inlet 12 of the infeed hopper 13, or between the intermediate zone 18 and the outfeed of the supply unit 2, in this instance directing the mass 6 into the storage bin 66, it is possible nonetheless to employ two or more such trolleys 28 able to perform a plurality of operations at once. For example, the device might utilize two trolleys 28 of which one can operate while the other is parked in the housing 27 to allow recharging or replacement of the battery 57.

What is claimed is:

1. A device linking a supply unit and a user unit for the manufacture of tobacco products, comprising:

at least one feed duct, along which to direct a flow of products as a compact mass from an outfeed of the supply unit to an infeed of the user unit, comprising two guide walls determining a depth of the mass of products;

means by which to separate the mass of products at a predetermined zone of the duct;

mobile means capable of traveling along the duct from the predetermined zone through a predetermined distance;

wherein the mobile means are capable of movement, induced by lifting means, at least between an at-rest position outside a dimensional compass of the duct, and an operating position inside the duct and coinciding with the predetermined zone.

2. A device as in claim 1, wherein the mobile means comprise means by which to push the mass of products from the predetermined zone through the predetermined distance, for emptying the duct from the mass of products.

3. A device as in claim 2, wherein the mobile means comprise means by which to cushion and accompany the mass of products in orderly fashion along the duct from the predetermined zone through the predetermined distance.

4. A device as in claim 1, wherein the mobile means comprise a trolley equipped with respective transport means enabling it to travel along the feed duct.

5. A device as in claim 4, wherein the trolley comprises at least one articulated structure of which a width and geometry are variable with variations in section and direction of the duct, in such a way as to maintain the respective transport means in contact with the duct.

6. A device as in claim 1, wherein the means bywbich to separate the mass of products comprise at least one md extending substantially perpendicularto the duct, capable of movement between an at-rest position outside a dimensional compass of the duct, and an operating position within the duct, coinciding with the predetermined zone and upstream of the mobile means considered in relation to a feed direction followed by the mass of products.

7. A device as in claim 6, wherein the rod is set in motion synchronously with the trolley during the movement of the trolley between the at-rest and operating positions, and the transport means function as means by which to remove the mass of products from the predetermined zone of the duct.

8. A device as in claim 1, wherein the means by which to separate the mass of products comprise spreader means designed to part the mass occupying the predetermined zone and thus empty the predetermined zone of products so that the mobile means are able to gain access to an inside of the duct.

9. A device as in claim 8, wherein the spreader means comprise two frames capable of movement between a position occupying substantially a same plane as one wall of the duct, and a substantially transverse position establishing two ends of the predetermined zone.

10. A device as in claim 8, wherein the spreader means comprise two frames angled in relation to the feed direction followed by the mass of products and disposed with free ends in mutual contact so as to create a wedge element, capable of movement thus between a position outside a dimensional compass of the duct and a position inside the duct, parting the mass of products.

11. A device as in claim 10, wherein the frames are capable of movement, on reaching a position inside the duct, between the angled position of mutual contact and a position substantially transverse to the feed direction followed by the mass of products.

12. A device as in claim 1, wherein the guide wall of the duct comprises a pair of conveyors occupying the predetermined zone, spaced apart transversely to the feed direction followed by the mass of products in such a way as to afford a passage to the mobile means.

13. A device as in claim 1, wherein the guide wall of the duct comprises a pair of conveyors occupying the predetermined zone, spaced apart transversely to a feed direction followed by the mass of products and including at least one retractable end in such a way as to afford a passage to the mobile means.

14. A device as in claim 1, comprising a housing in which the mobile means are accommodated when occupying the at-rest position outside the dimensional compass of the duct.

15. A device as in claim 14, comprising a duct along which the mobile means return to the housing from a position in the feed duct assumed on completing the predetermined distance.

16. A device as in claim 15, comprising means by which to transfer the mobile means from the position in the feed duct assumed on completing the predetermined distance, to an inlet of the return duct.

17. A device as in claim 4, wherein the transport means of the trolley comprise traction means by which each articulated structure is furnished with two opposed live surfaces positioned to engage the guide walls of the duct.

18. A device as in claim 17, wherein the transport means are embodied in such a way that when the trolley is in the at-rest position, at least the traction means relative to the face of the trolley offered to the duct comprise conveyor means which, during the movement of the trolley toward the operating position inside the duct, provide a moving outfeed surface extending parallel to a feed direction followed by the mass of products.

19. A device as in claim 3, wherein the mobile means comprise a trolley equipped with respective transport means enabling it to travel along the feed duct, wherein the trolley comprises at least one articulated structure of which a width and geometry are variable with variations in section and direction of the duct, in such a way as to maintain the respective transport means in contact with the duct, wherein the pushing means and the cushioning and accompanying means comprise two faces disposed substantially perpendicular to live surfaces and offered in contact to the mass of products during the traveling of the trolley, each comprising respective contact means offered to the mass of products and variable in length so as to adapt to the variation in section of the duct.

20. A device as in claim 19, wherein each one of the live surfaces includes at least one branch of a belt loop passing around two wheels carried by first ends of two first rods, mounted to respective first shafts coinciding with first end hinges, of which second ends are connected pivotably one to another together with a second shaft coinciding with a second intermediate hinge carrying an intermediate wheel positioned internally of the belt loop.

21. A device as in claim 20, wherein the first rods are connected at the respective first end hinges to respective second rods, each referable to a corresponding front or rear face, of which first ends are mounted pivotably to the first hinges and second ends are connected pivotably one to another by way of a third hinge.

22. A device as in claim 5, wherein the trolley comprises first and second articulated structures connected one to another by way of first and second shafts and comprising respective pairs of live surfaces.

23. A device as in claim 22, wherein each of the articulated structures making up the trolley comprises active components serving to vary the distance between at least one of the transport means and the live surfaces in such a way that these remain in contact with the guide walls of the feed duct determining the depth of the mass of products, notwithstanding variations in at least one of the distance between and the direction followed by the guide walls of the duct.

24. A device as in claim 23, wherein the active components comprise magnetic means associated with each of the first rods and interacting with the guide walls of the duct.

25. A device as in claim 23, wherein the active components comprise spring means associated with each pair of second rods and serving to vary an angle compassed by these same rods relative to the third hinge.

26. A device as in claim 23, wherein at least one of the live surfaces is driven by drive means carried by the trolley.

27. A device as in claim 26, wherein the drive means are powered from a battery carried by the trolley.

28. A device as in claim 26, wherein the drive means and the battery are interlocked to a control unit carried by the trolley.

29. A device as in claim 14, comprising at least one of means for recharging and means for replacing the battery, associated with the housing.

30. A device as in claim 28, wherein the control unit comprises means capable of receiving electromagnetic signals.

31. A device as in claim 2, wherein the mobile means are caused to move in a feed direction of the mass of products and to push the mass toward an inlet of an infeed hopper serving the user unit.

32. A device as in claim 2, wherein the mobile means are made to move in a direction opposite to a feed direction of the mass of products and to push the mass toward an inlet of a storage facility.

33. A device as in claim 1, wherein the feed duct extends from the outfeed of the supply unit to the infeed of the user unit, by way of a temporary storage facility accommodating the mass of products.

34. A device as in claim 33, wherein the temporary storage facility is a first-in-first-out unit of variable capacity.

* * * * *